United States Patent Office 3,772,332
Patented Nov. 13, 1973

3,772,332
TETRAHYDROPYRANYL AND TETRAHYDRO-
THIAPYRANYL PHENYLACETIC ACID COM-
POUNDS
Andre Allais, Les Lilas, Jean Meier, Coeuilly-Champigny,
and Jacques Dube, Eaubonne, France, assignors to
Roussel UCLAF, Paris, France
No Drawing. Continuation of abandoned application Ser.
No. 55,221, July 15, 1970. This application Apr. 12,
1972, Ser. No. 243,455
Claims priority, application France, July 18, 1969,
6924537
Int. Cl. A61k 27/00; C07d 65/04
U.S. Cl. 260—327 TH          20 Claims ABSTRACT OF THE DISCLOSURE
Novel compounds of the formula

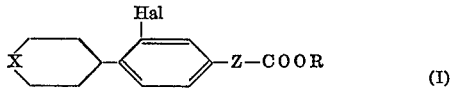

(I)

wherein X is selected from the group consisting of oxygen, sulfur, SO and SO$_2$, R is selected from the group consisting of hydrogen, anion of a non-toxic, therapeutically acceptable organic or mineral base and residue of an alcohol, and Z is selected from the group consisting of —CHR$_1$— and >C=R$_2$ wherein R$_1$ is selected from the group consisting of hydrogen and straight or branched alkyl of 1 to 4 carbon atoms, and R$_2$ is a straight or branched alkylidene of 1 to 4 carbon atoms and Hal is selected from the group consisting of fluorine, bromine and chlorine, which compounds which contain at least one asymmetric carbon atom can be in racemic or optically active form, and their preparation which compounds have analgesic and anti-inflammatory activity.

This is a continuation, Ser. No. 55,221, filed July 15, 1970, now abandoned.

STATE OF THE ART

Compounds useful for treatment of inflammatory conditions such as observed in evolutionary phases of rheumatism fall into 3 groups independent from cortisones: anti-inflammatory-analgesic group, anti-pyretic group, analgesic and anti-malarial group. These classes differ substantially in their method of activity. Some have immediate curative effect of short duration while the others, particularly the anti-malarial group, have a late therapeutic activity generally appearing only after a treatment time of several weeks.

The preferred drugs for treatment of rheumatism conditions are the anti-inflammatory-analgesic class because of their rapid and general use and the success of recent medicaments with more and more active anti-rheumatic products necessitates the use of lower and lower daily doses or lower and lower minimum blood levels.

The recently attained therapeutic progress is not only reflected in their values. The anti-rheumatism medicaments have, in therapeutic practice, raised often conflicting medical evaluations without relation to their activity as anti-inflammatory activity. One of the determining reasons for this disagreement resides in the fact that their use requires generally prolonged treatment at important dosages and therefore the products must not cause any toxic phenomena or intolerance phenomena.

According to Domenjoz [Aspects de la Chimiotherapie Antirhumatismale, Chimie. Thera. II (1967), p. 285], the "good tolerance" and "low toxicity" conditions are only partially achieved by presently available products which means that insufficient activity is not what has been criticized but the frequency and seriousness of the side effects. For this reason, research in this field should be directed toward better tolerated products and particularly for anti-inflammatory agents with greater therapeutic index than those currently available.

Therefore, it is desired to have available extremely active anti-inflammatory compounds of a type that they can be administered in sufficiently low dosages so that the appearance of toxic phenomena, modifications of blood count and particularly undesirable effects on gastric and intestinal mucous membranes need not be feared in prolonged treatment.

OBJECTS OF THE INVENTION

It is an object of the invention to provide the novel compounds of Formula I and the novel intermediates therefor.

It is a further object of the invention to provide a novel process for the preparation of the compounds of Formula I.

It is another object of the invention to provide novel therapeutic compositions and novel methods of treating inflammation and pain in warm-blooded animals.

These and other objects and advantages of the invention will become obvious from the following detailed description.

THE INVENTION

The novel phenylacetic acid compounds of the invention are compounds of the formula

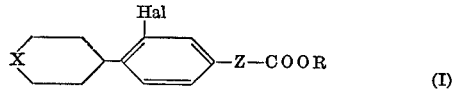

(I)

wherein X is selected from the group consisting of oxygen, sulfur, SO and SO$_2$, R is selected from the group consisting of hydrogen, anion of a non-toxic, therapeutically acceptable organic or mineral base and residue of an alcohol, and Z is selected from the group consisting of —CHR$_1$— and >C=R$_2$ wherein R$_1$ is selected from the group consisting of hydrogen and straight or branched alkyl of 1 to 4 carbon atoms and R$_2$ is a straight or branched alkylidene of 1 to 4 carbon atoms and Hal is selected from the group consisting of fluorine, bromine and chlorine, which compounds which contain at least one asymmetric carbon atom can be in racemic or optically active form.

The bases for forming salts of the acids of Formula I may be amines such as triethylamine, diethylamine, triethanolamine, etc., or an inorganic base such as an alkali metal hydroxide such as sodium or potassium hydroxide.

Examples of alcohol residues which may be used to form the esters of compounds of Formula I are such as of alkanols, i.e. methanol, ethanol, isopropanol, butanol, etc. and glycols such as glycerol, etc.

Examples of specific compounds of Formula I are 4-(4'-tetrahydropyranyl)-3-chloro-phenylacetic acid and its methyl ester; α-methyl - 4 - (4'-tetrahydropyranyl)-3-chloro-phenylacetic acid and its methyl ester; 4-(4'-tetrahydropyranyl)-3-bromo-phenylacetic acid and its methyl ester; α-methyl-4-(4'-tetrahydropyranyl)-3-bromo-phenylacetic acid and its methyl ester; 4-(4'-tetrahydropyranyl)-3-fluoro-phenylacetic acid and its methyl ester; α-ethyl-4-(4'-tetrahydropyranyl)-3-chloro-phenylacetic acid and its methyl ester; α-methyl-4-(4'-tetrahydropyranyl)-3-fluoro-phenylacetic acid and its methyl ester; α-methylene-4-(4'-tetrahydropyranyl)-3-chloro-phenylacetic acid; propane-2,3-diol ester of α-[4-(4'-tetrahydropyranyl) - 3 - chloro-phenyl]-propionic acid; 4 - (4'-tetrahydrothiapyranyl)-3-chloro-phenylacetic acid, its S-oxide and S-dioxide; α- methyl-4-(4'-tetrahydrothiapyranyl) - 3 - chloro-phenyl-acetic acid and its S-oxide and propane-2,3-diol ester of α-[4-(4'-tetrahydrothiapyranyl) - 3 - chloro-phenyl]-propionic acid.

The compounds of the invention fall into different categories depending upon the nature of X and Z for the processes of their preparation. The four categories of compounds are (1) compounds of the formula

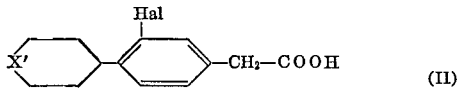

wherein X' is oxygen or sulfur and Hal has the above definition; (2) racemates or optically active isomers of the formula

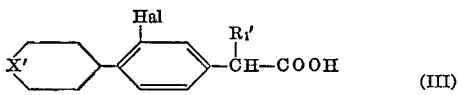

wherein X' and Hal have the above definitions and $R_1'$ is a straight or branched alkyl of 1 to 4 carbon atoms; (3) compounds of the formula

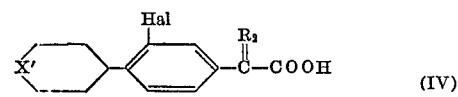

wherein X', Hal and $R_2$ have the above definitions; and (4) compounds of the formula

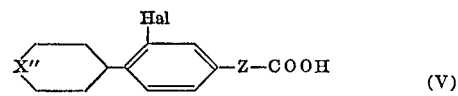

wherein Hal and Z have the above definitions and X" is SO or $SO_2$.

The conversion of the free acids into the corresponding salts and esters can be effected by conventional methods. For example, the acid can be reacted with an inorganic or organic base to form the salt or with usual esterification agents such as diazomethane to form the methyl ester. The α-glycerin esters can be made such as by forming an acid derivative such as an acid chloride which is reacted with a ketonide of glycerol and hydrolyzing the resulting product or by transesterification of a lower alkyl ester of the acid of Formula I with a ketonide of glycerol in the presence of an alkaline agent such as sodium, sodium amide or sodium hydride to form a ketonide of α-glycerin ester which is subjected to acid hydrolysis.

To form the compounds of Formula II, a compound of the formula

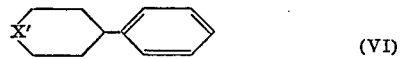

wherein X' has the above definition and is reacted with an acetylation agent in the presence of a Lewis acid to form a compound of the formula

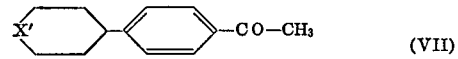

reacting the latter with a nitration agent to form a compound of the formula

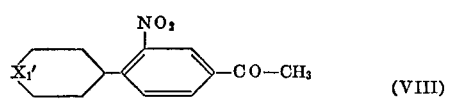

wherein $X_1'$ is oxygen or an oxidized sulfur atom, reducing the latter with a reducing agent to obtain a compound of the formula

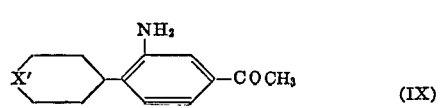

which is reacted through its diazonium salt to obtain a compound of the formula

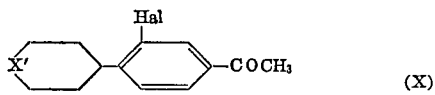

reacting the latter compound in an anhydrous medium with sulfur and a secondary or primary amine or ammonia to form a thioamide of the partial formula

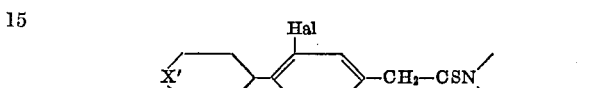

and subjecting the latter to acid or alkaline hydrolysis to form a compound of Formula II.

In a preferred embodiment of this process, the acetylating agent is a derivative of acetic acid such as acetyl chloride or bromide or acetic anhydride and the Lewis acid is aluminum chloride, stannic choride, zinc chloride or boron trifluoride. The nitrating agent may be concentrated nitric acid but is preferably a mixture of concentrated nitric acid and sulfuric acid. The reducing agent may be a metal such as iron, zinc or tin in the presence of an aqueous acid such as hydrochloric acid or acetic acid and the preferred reducing agent is stannous chloride in concentrated hydrochloric acid. The halogenated derivative of Formula X may be obtained by a classical method such as Sandmeyer reaction, Gattermann reaction or Balz-Schiemann reaction which consists in forming a diazonium salt which may be a fluoroborate, a chloride or a bromide and then decomposing the said salt. The last step of the process which consists in converting the —$COCH_3$ group to the $CH_2$—COOH group, may be effected by reacting compound X with sulfur and a secondary or primary amine or ammonia in an anhydrous medium. Examples of suitable amines are methylamine, dimethylamine, piperidine or preferably morpholine. The reaction is advantageously carried out in the presence of a trace of a strong acid such as p-toluene sulfonic acid whereby the thioamide corresponding to the acid of Formula II is formed which can be hydrolyzed in acid or alkaline media to the free acid of Formula II. The process to produce the compounds of Formula III having an alkyl radical, $R_1'$, in the α position to the carboxylic acid group comprises reacting an alkyl ester of the acid of Formula II in an anhydrous medium with a basic agent such as alkali metal amides, hydrides, or dialkyl amides and reacting the resulting compound with a halogenated derivative of the formula $R_1'Y$ wherein $R_1'$ is branched or straight chain alkyl of 1 to 4 carbon atoms and Y is chlorine, bromine or iodine to obtain an alkyl ester of the acid of Formula III which is then saponified by conventional methods.

A preferred embodiment of this process comprises reacting the methyl ester of the acid of Formula II with diethyl lithium amide in a mixture of hexamethyl phosphortriamide and tetrahydrofuran and then with an alkyl iodide. Other basic agents are sodium amide and sodium hydride and other suitable organic solvents are dimethylformamide and a mixture of ether-benzene. The saponification may be effected with potassium or sodium hydroxide in an aqueous alcoholic media.

Another method of forming the compounds of Formula III comprises condensing an alkyl ester of the acid of Formula II in an anhydrous media in the presence of a basic agent such as alkali metal amide, hydride or alcoholate with an alkyl oxalate and reacting the condensation product with an alkyl halide of the formula $R_1'$—Y wherein $R_1'$ and Y have the above definitions to obtain a compound of the formula

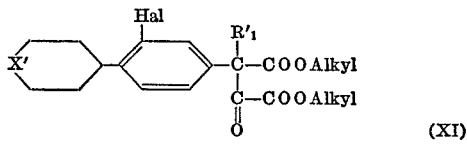

reacting the latter in an anhydrous medium with a basic agent such as an alkali metal alcoholate or amide to obtain an alkyl ester of the acid of Formula III which is then saponified by conventional methods such as with sodium hydroxide or potassium hydroxide in aqueous alcoholic media.

A preferred form of this process comprises using as the first basic agent an alkali metal tertiary alcoholate such as sodium ter.-amylate or potassium ter.-butylate and the alkyl halide is the iodide, and oxlate is decomposed by treatment with sodium methylate in dimethyl formamide.

The process of the invention for the preparation of the acids of Formula IV comprises reacting a compound of Formula VI with an acylating agent of the formula $R_1'$—COOH where $R_1'$ has the above definition in the presence of a Lewis acid to form a compound of the formula

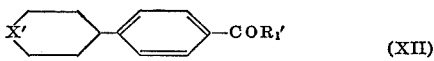

treating the resulting compound with a nitration agent to form a compound of the formula

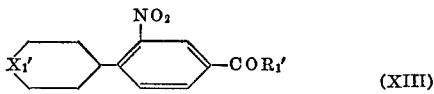

wherein $X_1'$ is oxygen or an oxidized sulfur atom, reducing the latter to obtain the amino compound of the formula

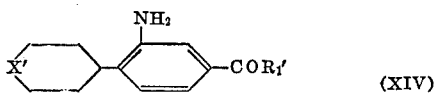

converting the latter through its diazonium salt to a compound of the formula

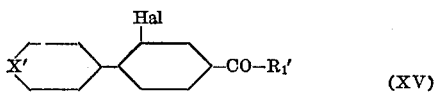

reacting the latter with hydrocyanic acid to form a compound of the formula

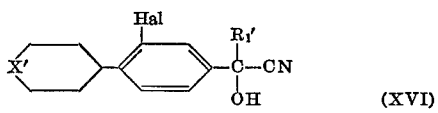

which is then hydrolyzed to a compound of the formula

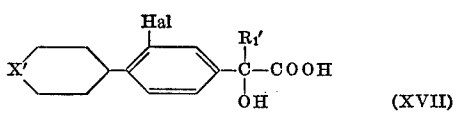

and dehydrating the latter to form an acid of Formula IV.

In a preferred mode of this process, the nitration agent, reducing agent, Lewis acid and halogenation are similar to those for the process of preparing compounds of Formula II. The acylating agent is preferably a functional derivative of an acid of the formula $R_1'$COOH such as its acid chloride or bromide or acid anhydride. The reaction with hydrocyanic acid is preferably effected in the presence of a tertiary amine such as pyridine, lutidine or collidine. The hydrolysis to form the acid of Formula XVII can be effected in a single step or in 2 steps with isolation of the intermediate amide. The dehydration step to form the acid of Formula IV is effected with a dehydrating agent such as sulfuric acid, phosphoric acid, phosphoric acid anhydride and preferably p-toluene sulfonic acid. The compounds of Formula IV thus obtained can be reduced such as with hydrogen in the presence of platinum oxide catalyst or in the present of a Raney nickel catalyst to form a compound of Formula III.

Another process for the preparation of compounds of Formula III comprises condensing in an anhydrous medium in the presence of an alkaline condensation agent such as an alkali metal alcoholate or amide an alkyl haloacetate with a compound of the formula

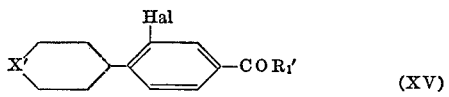

to obtain the corresponding epoxy compound of the formula

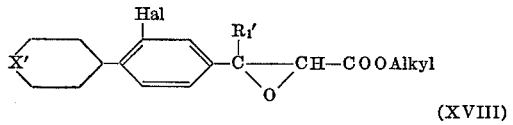

subjecting the latter to alkaline hydrolysis followed by acidification to obtain a compound of the formula

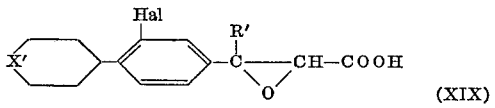

subjecting the latter to decarboxylation by known means to obtain a compound of the formula

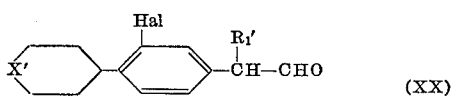

reacting the resulting aldehyde with an oxidation agent to obtain an acid of the formula

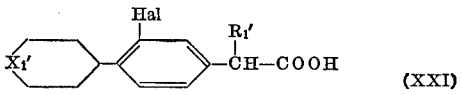

wherein $X_1'$ is oxygen or oxidized sulfur and when $X_1'$ is oxidized sulfur, the compound is subjected to a reducing agent.

In a preferred embodiment of this process, the alkaline hydrolysis of compound of Formula XVIII is effected with an alkali metal base such as sodium hydroxide or potassium hydroxide and the acidification is effected with an inorganic acid such as hydrochloric acid or sulfuric acid. The decarboxylation is effected by heating an alkali metal salt of the acid of Formula XIX in the presence of calcium oxide. The oxidation of the aldehyde of Formula XX may be effected with a sulfo-chromic mixture. The reducing agent can be a metal such as iron, tin or zinc in the presence of an aqueous acid such as hydrochloric acid or acetic acid or stannous chloride in concentrated hydrochloric acid or preferably triphenylphosphine or phosphorus trichloride.

The process for the preparation of compounds of Formula V comprises reacting a compound of the formula

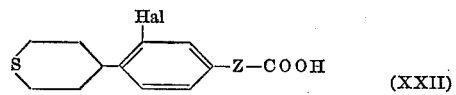

wherein Hal and Z have the above definitions with an oxidizing agent. The starting compound can be prepared by the above processes when Z is CH—$R_1$ or $>C=R_2$. Suitable oxidizing agents are nitric acid, hydrogen peroxide or peracids. To prepare sulfoxides of Formula V, hydrogen peroxide in acetic acid is preferred with a reaction temperature of about 20° C. To prepare the corresponding sulfones, an excess of the same reagent is used with a reaction temperature of about 50 to 70° C.

The analgesic and anti-inflammatory compositions are comprised of an effective amount of a compound of Formula I and a major amount of a pharmaceutical carrier. The compositions may be in the form of injectable solutions or suspensions in ampoules or multidose flacons, in the form of tablets, coated tablets, capsules, syrups, suppositories or ointments prepared in the usual manner. The compositions are very active and the active ingredient is administered at very low doses and is well tolerated. They are suitable for treatment of articular pain and rheumatism symptoms.

The novel method of the invention for treating pain and inflammations in warm-blooded animals comprises administering an effective amount of a compound of Formula I to warm-blooded animals. The active compound may be administered orally, transcutaneously, rectally or locally by topical application on the skin and mucous membranes. The average usual daily dosage is 0.15 to 3.5 mg./kg.

In the following examples there are described several preferred examples to illustrate the invention. However, it should be understood that the invention is not intended to be limited to the specific embodiments.

EXAMPLE I

Preparation of 4-(4'-tetrahydropyranyl)-3-chloro-phenylacetic acid

Step A: 4-(4'-tetrahydropyranyl-acetophenone).—189 gm. of aluminum chloride were suspended in 450 cc. of methylene chloride at 10 °C. and then 45 cc. of acetyl chloride were added thereto over 5 minutes. A solution of 90 gm. of 4-phenyl-tetrahydropyran [prepared by process of Ber. vol. 56 (1923), p. 2013] in 450 cc. of methylene chloride and then 90 cc. of methylene chloride were progressively added to the reaction mixture and the mixture was then stirred for 2 hours at 10° C. and then 4 hours at room temperature. A solution of 144 cc. of hydrochloric acid in 820 cc. of water was added thereto and the organic phase was decanted off. The aqueous phase was extracted with methylene chloride and the combined organic phases were washed with water, then with a saturated aqueous sodium bicarbonate solution and then with water, was dried over sodium sulfate and evaporated to dryness in vacuo. The residue was dissolved in 115 cc. of hot isopropyl ether, which was iced overnight and filtered. The precipitate was washed with cold isopropyl ether and dried in vacuo to obtain 81.2 gm. (72% yield) of 4-(4'-tetrahydropyranyl)-acetophenone melting at 79–80° C. and was used as is for the next step.

For analysis, the product was recrystallized from hot and cold isopropyl ether and had a melting point of 80° C. The product occurred as colorless crystals soluble in methanol and methylene chloride and was insoluble in water.

Analysis.—Calcd. for $C_{13}H_{16}O_2$ (molecular weight =204.26) (percent): C, 76.44; H, 7.90. Found (percent): C, 76.2; H, 7.5.

The RMN Spectrum confirmed the presence of $COCH_3$ in the para-position.

IR spectrum (chloroform):

Presence of conjugated ketone at 1679 cm.$^{-1}$.
Presence of $COCH_3$ at 1360 cm.$^{-1}$.
Presence of aromatics at 1608 and 1573 cm.$^{-1}$.

As far as is known, this compound is not described in the literature.

Step B: 4-(4'-tetrahydropyranyl) - 3 - nitro - acetophenone.—20 gm. of 4-(4'-tetrahydropyranyl)-acetophenone were dissolved in 100 cc. of sulfuric acid and the solution was cooled to −10° C. 20 cc. of nitric acid ($d.=1.49$) was added over 2 hours and the mixture was allowed to stand for another hour and 15 minutes at −10° C. The solution was added to a mixture of ice and water with stirring under nitrogen. The mixture was extracted with methylene chloride and the organic phase was washed with water, then with a saturated aqueous sodium bicarbonate solution and then with water until the wash-waters were neutral. The solution was dried over sodium sulfate and evaporated to dryness in vacuo to obtain 23.18 gm. (95% yield) of 4-(4'-tetrahydropyranyl)-3-nitro-acetophenone melting at about 70° C.

For analysis, 2.4 gm. of the product were recrystallized from hot and cold methanol to obtain 1.15 gm. of the said compound melting at 78° C. The compound occurred as beige crystals soluble in chloroform, methylene chloride and hot alcohols and insoluble in water.

Analysis.—Calcd. for $C_{13}H_{15}NO_4$ (molecular weight =249.26) (percent): C, 62.64; H, 6.07; N, 5.62. Found (percent): C, 62.6; H, 5.9; N, 5.3.

IR spectrum ($CHCl_3$):

Presence of $COCH_3$ at 1696 cm.$^{-1}$.
Presence of $NO_2$ at 1534 cm.$^{-1}$ and 1357 cm.$^{-1}$.
Presence of aromatic substituted with a hetero atom.

As far as is known, this compound is not described in the literature.

Step C: 4-(4'-tetrahydropyranyl)-3-amino-acetophenone.—35 gm. of 4-(4'-tetrahydropyranyl)-3-nitro-acetophenone were suspended in 290 cc. of hydrochloric acid and after the addition of 93 gm. of stannous chloride thereto, the reaction mixture was heated at 60° C. for 6 hours. The temperature was returned to room temperature and the mixture was left overnight with stirring. The mixture was iced for 30 minutes and vacuum filtered and the precipitate was washed with water and was then suspended in 300 cc. of 2 N sodium hydroxide solution. The suspension was stirred for 4 hours at 25° C. and was then vacuum filtered. The filtrate was washed with water and evaporated to dryness in vacuo to obtain 24.7 gm. of 4-(4'-tetrahydropyranyl)-3-amino-acetophenone melting at 164° C. which was used as is for the next step.

For analysis, 820 mg. of the compound were recrystallized from hot and cold methanol to obtain 570 mg. of a product melting at 164° C. The compound occurred in the form of ochre crystals soluble in chloroform and hot alcohols and insoluble in water.

Analysis.—Calcd. for $C_{13}H_{17}NO_2$ (molecular weight =219.17) (percent): C, 71.20; H, 7.82; N, 6.39. Found (percent): C, 71.1; H, 7.5; N, 6.7.

IR spectrum ($CHCl_3$):

Presence of $NH_2$ at 3475 and 3395 cm.$^{-1}$.
Presence of $COCH_3$ at 1675 and 1357 cm.$^{-1}$.

As far as is known, this compound is not described in the literature.

Step D: 4-(4'-tetrahydropyranyl)-3-chloro-acetophenone.—A mixture of 1440 cc. of water and 900 cc. of hydrochloric acid cooled to 10° C. was added to a three-necked balloon flask and 89.8 gm. of 4-(4'-tetrahydropyranyl)-3-amino-acetophenone were added while cooling to 5° C. followed by the addition of a solution of 29.25 gm. of sodium nitrite in 55 cc. of water. The mixture was stirred for 30 minutes while keeping the temperature at 5° C. and then a solution of 119 gm. of cuprous chloride in 2070 cc. of hydrochloric acid was slowly added thereto. The reaction mixture was stirred overnight at room temperature with stirring and was then vacuum filtered. The precipitate was washed with water and dried in vacuo to obtain 71.76 gm. of raw 4-(4'-tetrahydropyranyl)-3-chloro-acetophenone melting at 57° C. which was purified by recrystallization from hot and cold isopropyl ether to obtain 46.4 gm. (47% yield) of the said product melting at 59° C. Concentration of the mother liquors gave another 7.7 gm. of the product for a total yield of 55%.

The product occurred in the form of ochre crystals soluble in alcohol and chloroform and insoluble in water.

Analysis.—Calcd. for $C_{13}H_{15}ClO_2$ (molecular weight =238.71) (percent): C, 65.41; H, 6.33; Cl, 14.85. Found (percent): C, 65.2; H, 6.2; Cl, 14.5.

IR spectrum (CHCl₃):

Presence of conjugated ketone at 1688 cm.⁻¹.
Presence of COCH₃ at 1356 cm.⁻¹.
Presence of aromatic ring.

As far as is known, this compound is not described in the literature.

By similar methods beginning with 4-(4'-tetrahydropyranyl)-3-amino-acetophenone, 4-(4'-tetrahydropyranyl)-3-bromo-acetophenone was prepared by decomposition of the corresponding diazoniumbromide with cuprous bromide and 4-(4'-tetrahydropyranyl)-3-fluoro-acetophenone was prepared by thermal decomposition of the corresponding diazonium fluoroborate compound. As far as is known, these compounds are not described in the literature.

Step E: 4-(4'-tetrahydropyranyl)-3-chloro-phenylacetic acid.—A mixture of 6 gm. of 4-(4'-tetrahydropyranyl)-3-chloro-acetophenone, 800 mg. of sulfur, 96 mg. of p-toluenesulfonic acid and 5 cc. of morpholine was refluxed for 3 hours and after cooling to 15° C., a mixture of 150 cc. of acetic acid, 50 cc. of sulfuric acid and 25 cc. of water was added thereto. The reaction mixture was heated to reflux with agitation and under a nitrogen atmosphere for 20 hours and after returning the temperature to 15° C., the mixture was poured into water. The mixture was extracted 3 times with 250 cc. of methylene chloride and the combined organic phases were extracted 3 times with 100 cc. of 2 N sodium hydroxide solutions. The aqueous phase was treated with carbon black, filtered and acidified by the addition of 55 cc. of hydrochloric acid. The solution was extracted with methylene chloride and the organic phase was washed with water, dried over sodium sulfate and evaporated to dryness in vacuo. The residue was taken up in 6 cc. of isopropyl ether and stirred at room temperature until crystallization was complete. The crystals were vacuum filtered, washed with isopropyl ether and dried in vacuo to obtain 2.92 gm. of 4-(4'-tetrahydropyranyl)-3-chloro-phenylacetic acid melting at 137° C.

The product occurred in the form of beige crystals soluble in acetone and insoluble in water. Recrystallization did not change the melting point.

*Analysis.*—Calcd. for C₁₃H₁₅ClO₃ (molecular weight =254.72) (percent): C, 61.30; H, 5.93; Cl, 13.92. Found (percent): C, 61.3; H, 5.8; Cl, 13.9.

IR spectrum (CHCl₃):

Presence of C=O at 1712 cm.⁻¹.
Presence of aromatic at 1608, 1558 and 1490 cm.⁻¹.

Using the same procedure, the corresponding 4-(4'-tetrahydropyranyl)-3-fluoro-phenylacetic acid and 4-(4'-tetrahydropyranyl)-3-bromo-phenylacetic acid were prepared.

As far is known, these compounds are not described in the literature.

EXAMPLE II

Preparation of α-methyl-4-(4'-tetrahydropyranyl)-3-chloro-phenylacetic acid

Step A: Potassium salt of methyl ester of 3-[4'-(4''-tetrahydropyranyl)-3'-chloro]phenyl-oxalacetic acid.—A mixture of 3.09 gm. of the methyl ester of 4-(4'-tetrahydropyranyl)-3-chloro-phenylacetic acid, 2.3 gm. of potassium ter.-butylate and 2.3 gm. of methyl oxalate in 30 cc. of benzene was refluxed for 4 hours. After cooling, the reaction mixture was evaporated to dryness in vacuo. The residue was empasted with 50 cc. of anhydrous ether for 10 minutes at room temperature and after vacuum filtration, the precipitate was washed with anhydrous ether and dried to obtain 5.07 gm. of the potassium salt of the methyl ester of 3-[4'-(4''-tetrahydropyranyl)-3'-chloro] phenyl oxalacetic acid which was used as is for the next step. The compound was in the form of a beige solid soluble in water and insoluble in ether and chloroform.

As far as is known, this compound is not described in the literature.

The starting methyl ester was obtained by reaction of diazomethane with 4-(4'-tetrahydropyranyl)-3-chloro-phenylacetic acid in 99% yield as an amorphous product having a chlorine content of 13.3% (theory—13.19%). As far as is known, this compound is not described in the literature.

Step B: Methyl ester of 2-oxo-3-[4'-(4''-tetrahydropyranyl)-3'-chloro]-phenyl-3-methyl succinic acid.—A mixture of 5 gm. of the potassium salt of Step A and 3 cc. of methyl iodide in 100 cc. of dimethylformamide was held at room temperature for 4 hours and was then heated to 95° C. for 3 hours. The mixture was then evaporated to dryness under reduced pressure and the residue was stirred in 200 cc. of methylene chloride for 10 minutes at room temperature. The mixture was filtered and the methylene chloride filtrate was washed with water, dried over sodium sulfate and evaporated to dryness under reduced pressure to obtain 3.9 gm. (92% yield) of raw product. The said product was purified by chromatography over silica gel and elution with a mixture of ether-petroleum ether (50–50) to obtain 1.065 gm. of the methyl ester of 2-oxo-3-[4'-(4''-tetrahydropyranyl)-3'-chloro)-phenyl-3-methyl-succinic acid melting at about 50° C. The product was in the form of a beige solid soluble in chloroform, methylene chloride and isopropyl ether and insoluble in water.

As far as is known, this product is not described in the literature.

Step C.: Methyl ester of α-methyl-4-(4'-tetrahydropyranyl)-3'-chloro-phenylacetic acid.—A solution of 870 mg. of the methyl ester of 2-oxo-3-[4'-(4''-tetrahydropyranyl)-3'-chloro]-phenyl-3-methyl succinic acid in 17 cc. of dimethylformamide was treated at 100° C. for 2 hours with 1.6 cc. of a methanolic solution of sodium methylate (prepared from 1.71 gm. of sodium in 50 cc. of methanol). After cooling down, the mixture was evaporated to dryness under reduced pressure and the residue was taken up in a solution of 1.2 cc. of 2 N hydrochloric acid in 30 cc. of water. The mixture was extracted with methylene chloride and the organic phase was washed with water, dried over sodium sulfate and evaporated to dryness under reduced pressure. The residue was subjected to chromatography over silica gel and elution with a 75:25 mixture of ether and petroleum ether to obtain 200 mg. (30% yield) of the methyl ester of α-methyl-4-(4'-tetrahydropyranyl)-3-chloro-phenyl-acetic acid melting at 78° C.

The product occurred in the form of beige crystals soluble in chloroform, methanol, ether and methylene chloride and insoluble in water.

*Analysis.*—Calcd. for C₁₅H₁₉ClO₃ (molecular weight= 282.78) (percent): C, 63.71; H, 6.77; Cl, 12.54. Found (percent): C, 63.5; H, 6.6; Cl, 12.8.

IR spectrum (CHCl₃):

Presence of aromatic.
Presence of ether oxide.
Presence of carbonyl band due to ester function.

As far as is known, this product is not described in the literature.

Step D: α-Methyl-4-(4'-tetrahydropyranyl)-3-chloro-phenylacetic acid.—A mixture of 145 mg. of the methyl ester of α-methyl-4-(4'-tetrahydropyranyl)-3-chloro-phenylacetic acid, 1.5 cc. of ethanol and 0.15 cc. of a solution of 48° Bé of potassium hydroxide was refluxed for one hour. Then, the ethanol was distilled off under vacuum and the residue was taken up in 2 cc. of water. The solution of the alkaline salt was adjusted to a pH of 1 by addition of 0.15 cc. of hydrochloric acid and the precipitate formed was extracted with methylene chloride. The organic phase was washed with water until the wash waters were neutral, was dried over sodium sulfate and evaporated to dryness under reduced pressure. The 130 mg. of raw product was empasted with 0.5 cc. of isopropanol ether and the mixture was vacuum filtered. The solid product was washed with isopropyl ether and dried under reduced pressure to obtain 44 mg. of α-methyl-4-(4′-tetrahydropyranyl)-3-chlorophenylacetic acid melting at 121° C. The colorless crystals were soluble in methylene chloride and alkaline solutions, slightly soluble in isopropyl ether and insoluble in water.

*Analysis.*—Calcd. for $C_{14}H_{17}ClO_3$ (molecular weight= 268.74) (percent): C, 62.57; H, 6.37; Cl, 13.19. Found (percent): C, 62.5; H, 6.2; Cl, 13.1–13.2.

IR spectrum ($CHCl_3$):

Presence of ether oxide.
Presence of aromatic.

As far as is known, this compound is not described in the literature.

EXAMPLE III

Preparation of α-methyl-4-(4′-tetrahydropyranyl)-3-chlorophenylacetic acid

Step A: A solution of 5 gm. of 4-(4′-tetrahydropyranyl)-3-chloro-acetophenone in 5 cc. of pyridine was added to 5 cc. of anhydrous hydrocyanic acid cooled to 0° C. stirred for 16 hours at +5° C. and then 55 cc. of concentrated hydrochloric acid and 25 cc. of ether were added thereto. A current of gaseous hydrochloric acid was passed through the reaction mixture for 24 hours at room temperature with stirring. The mixture was poured into an ice-water mixture and the precipitate was extracted with ether containing 10% methylene chloride. The solution was washed with water, then a saturated aqueous sodium bicarbonate solution and then water until the wash waters were neutral, dried over sodium sulfate and evaporated to dryness under reduced pressure. The residue was empasted with 50 cc. of isopropyl ether with stirring at room temperature until crystallization was complete and the mixture was vacuum filtered. The precipitate was washed with isopropyl ether and dried under vacuum to obtain 2.7 gm. of α-hydroxy-α-methyl-4-(4′-tetrahydropyranyl)-3-chloro-phenylacetamide melting at 135° C. The product occurred in the form of beige crystals soluble in alcohols, slightly soluble in methylene chloride and insoluble in water. The compound was used as is for the next step.

IR Spectrum (Nujol):

Presence of carbonyl at 1680 cm.$^{-1}$.
Presence of aromatic ring.
Absorption towards 3μ (OH/NH).

As far as is known, this product is not described in the literature.

Step B: α-Hydroxy-α-methyl-4-(4′-tetrahydropyranyl)-3-chloro-phenylacetic acid.—3.4 gm. of sodium hydroxide were dissolved in 34 cc. of water and 34 cc. of ethanol and 2.7 gm. of α-hydroxy-α-methyl-4-(4′-tetrahydropyranyl)-3-chloro-phenylacetamide were added to the solution which was refluxed for 18 hours. The ethanol was distilled off at normal pressure and the mixture was filtered in the cold. The solution was allowed to return to room temperature and the pH was adjusted to 1 by addition of 45 cc. of 2 N hydrochloric acid. The precipitated fraction was extracted 4 times with methylene chloride and the methylene chloride phase was washed with water until the wash waters were neutral, dried over sodium sulfate and evaporated to dryness under reduced pressure to obtain 2.7 gm. of α-hydroxy-α-methyl-4-(4′-tetrahydropyranyl) - 3-chloro-phenylacetic acid melting at 167° C. The product occurred in the form of colorless crystals soluble in hot alcohols, slightly soluble in chloroform and insoluble in water. For analysis, the product was recrystallized from hot and cold ethanol without change in the melting point.

*Analysis.* — Calcd. for $C_{14}H_{17}ClO_4$ (molecular weight=284.74) (percent): C, 59.05; H, 6.02; Cl, 12.45. Found (percent): C, 58.8; H, 6.1; Cl, 12.6.

IR spectrum (Nujol):

Presence of aromatic.
Presence of carbonyl at 1731 cm.$^{-1}$.
Absorption at the OH band.

As far as is known, this compound is not described in the literature.

Step C: α-Methylene-4-(4′-tetrahydropyranyl)-3-chloro-phenylacetic acid.—A mixture of 1.9 gm. of α-hydroxy-α-methyl-4-(4′ - tetrahydropyranyl) - 3-chloro - phenylacetic acid and 0.45 gm. of p-toluene sulfonic acid in 190 cc. of toluene was refluxed for five hours while separating water by azeotropic distillation and after cooling to room temperature, the toluene phase was washed with water, dried over sodium sulfate and evaporated to dryness under reduced pressure. The residue was empasted with 3 cc. of isopropyl ether with stirring and after icing for 1 hour, the mixture was vacuum filtered and the precipitate was dried under reduced pressure to obtain 1.7 gm. of α-methylene-4-(4′-tetrahydropyranyl)-3-chloro-phenylacetic acid melting at 149° C. The product occurred in the form of colorless crystals soluble in chloroform and hot alcohols and insoluble in water. The product was used as is for the next step.

IR spectrum (chloroform):

Absence of —OH.
Presence of $CH_2$=C at 891 cm.$^{-1}$.
Presence of C=C at 1617 cm.$^{-1}$.

As far as is known, this product is not described in the literature.

Step D: α - Methyl-4-(4′-tetrahydropyranyl)-3-chlorophenylacetic acid.—A mixture of 1.7 gm. of α-methylene-4-(4′-tetrahydropyranyl)-3-chloro-phenylacetic acid and 72 mg. of platinum oxide in 17 cc. of ethanol is introduced into a purged apparatus and agitated under hydrogen. After the theoretical quantity of hydrogen was absorbed, the mixture was stirred for 10 minutes and the catalyst was removed by vacuum filtration. The filtrate was evaporated to dryness to obtain 1.75 gm. of raw product which was purified by recrystallization from hot and cold isopropyl ether to obtain 686 mg. (40% yield) of α-methyl-4-(4′-tetrahydropyranyl) - 3-chloro-phenylacetic acid melting at 121° C. The product was identical to that of Example II.

EXAMPLE IV

Preparation of 4-(4′-tetrahydrothiapyranyl)-3-chloro-phenylacetic acid

Step A: 4-(4′-tetrahydrothiapyranyl)-acetophenone.— 187 gm. of aluminum chloride were suspended in 1500 cc. of methlyene chloride, cooled at a temperautre from 0° C. to +5° C. and then 623 cc. of acetylchloride were added. A solution of 62.3 gm. of 4-phenyl-thiacyclohexene [Cook et al., J. Chem. Soc. (1968) B.P. 1467] in 390 cc. of methylene chloride was added thereto at +10° C., with agitation and the reaction mixture was then stirred for 2 hours at 10° C. The temperature was returned to room temperature and the mixture was then allowed to stand for 4 hours. After cooling to 0 to 5° C., a solution of 320 cc. of hydrochloric acid and 980 cc. of water was added thereto and the aqueous phase was extracted with methylene chloride. The organic phase was washed with a saturated aqueous sodium bicarbonate solution and then with water, dried over sodium sulfate and evaporated to dryness under reduced pressure. The residue was empasted with methanol until crystallization was complete and the crystals were vacuum filtered, washed with methanol and dried under reduced pressure to obtain 51.7 gm. (67% yield) of raw product melting at 151° C.

For analysis, 0.70 gm. of raw 4-(4′-tetrahydrothiapyranyl)-acetophenone was dissolved in refluxing methanol, filtered in the cold and crystallization was induced.

The mixture was iced for 20 minutes and the mixture was vacuum filtered. The crystals were washed with iced methanol and dried under reduced pressure to obtain 0.657 gm. of 4-(4'-tetrahydrothiapyranyl)-acetophenone melting at 152° C. The colorless crystals were soluble in chloroform and methylene chloride and insoluble in water.

Analysis. — Calcd. for $C_{13}H_{16}OS$ (molecular weight=220.33) (percent): C, 70.87; H, 7.32; S, 14.55. Found (percent): C, 70.6; H, 7.3; S, 14.2.

IR spectrum $(CHCl_3)$:

Presence of aromatic.
Presence of conjugated ketone at 1671 cm.$^{-1}$.

As far as is known, this compound is not described in the literature.

Step B: S-oxide of 4-(4'-tetrahydrothiapyranyl)-3-nitro-acetophenone.—50 gm. of 4-(4'-tetrahydrothiapyranyl)-acetophenone were dissolved with agitation at room temperature in 226 cc. of sulfuric acid and the solution was cooled to —10° C. 22.6 cc. of nitric acid ($n=1.49$) were slowly added to the reaction mixture which was allowed to stand for 45 minutes at —10° C. The reaction mixture was cooled to —20° C. and poured into an ice water mixture and was stirred for 10 minutes. The mixture was extracted with methylene chloride and the methylene chloride phase was washed with a saturated aqueous sodium bicarbonate solution, then with water, was dried over sodium sulfate and was evaporated to dryness under reduced pressure. The residue was empasted with methanol until crystallization was complete and the crystals were vacuum filtered, washed with methanol and dried under reduced pressure to obtain 30 gm. (47% yield) of raw product melting at 187° C.

For analysis, 1 gm. of raw product was dissolved in 8 cc. of refluxing methanol, and the solution was hot filtered and crystallization was started. After icing for 30 minutes, the mixture was vacuum filtered and the crystals were washed with iced methanol and dried under reduced pressure to obtain 0.58 gm. of S-oxide of 4-(4'-tetrahydrothiapyranyl)-3-nitro-acetophenone melting at 188° C. The pale yellow prisms of the product were soluble in chloroform and methylene chloride and insoluble in water.

Analysis.—Calcd. for $C_{13}H_{15}O_4NS$ (molecular weight=281.32) (percent): C, 55.50; H, 5.37; N, 4.98; S, 11.40. Found (percent): C, 55.7; H, 5.2; N, 5.1; S, 11.3.

IR spectrum $(CHCl_3)$:

Presence of conjugated ketone.
Presence of aromatic.
Presence of —$NO_2$.
Presence of S→O at 1052, 1024 and 1000 cm.$^{-1}$.

As far as is known, this compound is not described in the literature.

Step C: 4 - (4'-tetrahydrothiapyranyl)-3-amino-acetophenone.—30 gm. of S-oxide of 4-(4'-tetrahydrothiapyranyl)-3-nitro-acetophenone were dissolved in 90 cc. of concentrated hydrochloric acid with stirring and the temperature of the solution was adjusted to 15° C. A solution of 192 gm. of stannous chloride in 960 cc. of hydrochloric acid was added thereto at a temperature below 20° C. and the mixture was stirred for 18 hours at room temperature. The mixture was iced for 1 hour and was vacuum filtered. The precipitate was added to 150 cc. of sodium hydroxide solution and 150 cc. of water and the mixture was stirred for 1 hour and then was vacuum filtered. The precipitate was washed with water and dried under reduced pressure to obtain 21.6 gm. of 4-(4'-tetrahydrothiapyranyl)-3-amino-acetophenone melting at 120° C.

For analysis, the product was recrystallized from hot and cold methanol without change of the melting point. The product occurred as yellow crystals soluble in chloroform and methylene chloride and insoluble in water.

Analysis.—Calcd. for $C_{13}H_{17}ONS$ (molecular weight=235.35) (percent): C, 66.34; H, 7.28; N, 5.95; S, 13.62. Found (percent): C, 66.0; H, 7.3; N, 5.8; S, 13.3.

IR spectrum $(CHCL_3)$:

Absence of $NO_2$.
Absence of S→O.
Presence of conjugated ketone at 1682 cm.$^{-1}$.
Bands at 1625, 1604, 1573 and 1505 cm.$^{-1}$ (aromatic region).
Presence of $NH_2$ at 3470 and 1987 cm.$^{-1}$.

As far as is known, this product is not described in the literature.

Step D: 4 - (4'-tetrahydrothiapyranyl)-3-chloro-acetophenone.—23 gm. of 4 - (4' - tetrahydrothiapyranyl)-3-mino-acetophenone were suspended in 370 cc. of water and 230 cc. of hydrochloric acid and after cooling to 3° C., a solution of 6.68 gm. of sodium nitrite in 12 cc. of water was added thereto. The mixture was stirred for 30 minutes at 3° C. and then a solution of 27.83 gm. of cuprous chloride in 500 cc. of hydrochloric acid and then 5 cc. of ether were added thereto. After raising the temperature to room temperature, the mixture was stirred for 18 hours and then was vacuum filtered. The precipitate was washed with water to obtain a complex of cuprous chloride and 4-(4'-tetrahydrothiapyranyl)-3-chloro-acetophenone melting at 210° C.

Analysis.—Calcd. for $C_{13}H_{15}OCl_2SCu$ (molecular weight=353.77) (percent): Cl, 20.0; Cu, 17.9. Found (percent): Cl, 18.9–19.2; Cu, 16.7–16.8.

The said complex was added to 120 cc. of ammonium hydroxide solution, 100 cc. of water and 20 cc. of ether and the mixture was stirred for 1 hour and was extracted with methylene chloride. The methylene chloride phase was washed with water, dried over sodium sulfate and evaporated to dryness to obtain 24.6 gm. (99% yield) of the raw 3-chloro compound. The raw product was purified by recrystallization from hot and cold isopropyl ether to obtain 17 gm. (69%) of 4-(4'-tetrahydrothiapyranyl)-3-chloro-acetophenone melting at 66° C.

For analysis, the product was recrystallized from hot and cold isopropyl ether without changing the melting point. The beige crystals were soluble in methanol, methylene chloride and chloroform and insoluble in water.

Analysis.—Calcd. for $C_{13}H_{15}OClS$ (molecular weight= 254.78) (percent): C, 61.28; H, 5.93; Cl, 13.92; S, 12.58. Found (percent): C, 61.5; H, 6.0; Cl, 14.1; S, 12.4.

IR spectrum $(CHCl_3)$:

Presence of aromatic substituted with hetero atom.
Presence of conjugated ketone at 1678 cm.$^{-1}$.
Absence of $NH_2$.

As far as is known, this compound is not described in the literature.

Step E: 4-(4'-tetrahydrothiapyranyl)-3-chloro-phenyl-acetic acid.—A mixture of 14.5 gm. of 4-(4'-tetrahydrothiapyranyl)-3-chloro-acetophenone, 3.648 gm. of precipitated sulfur, 58 cc. of morpholine and 230 mg. of p-toluene sulfonic acid was heated at reflux for 24 hours and after cooling, 200 cc. of methylene chloride were added thereto. The methylene chloride phase was washed 3 times with 250 cc. of water, was dried over sodium sulfate and evaporated to dryness under reduced pressure to obtain 29.1 gm. of raw thioamide. The said thioamide was taken up in a solution of 24.3 gm. of potassium hydroxide in 243 cc. of ethanol, was refluxed for 18 hours and after cooling, the mixture was filtered and the filtrate was evaporated to dryness under reduced pressure. The residue was taken up in 200 cc. of water and 35 cc. of hydrochloric acid were added thereto to make it acidic. The precipitate was extracted with methylene chloride and the methylene chloride phase was washed with water, dried over sodium sulfate and evaporated to dryness under reduced pressure. The heavy residue of 20.38 gm. was subjected to chromatography over silica gel with elution with a mixture of benzene-ethyl acetate-acetic acid (49–49–2). After evaporation of the eluate to dryness, the residue was taken up in an aqueous solution containing 20 gm. per liter of sodium bicarbonate. The solution was treated with carbon black and was filtered and 8 cc. of hydrochloric acid were added thereto. The mixture was iced for 20 minutes and vacuum filtered. The precipitate was washed with water and dried under reduced pressure to obtain 9.585 gm. of 4-(4'-tetrahydrothiapyranyl)-3-chloro-phenylacetic acid.

For analysis, the product was recrystallized from hot and cold cyclohexane to obtain beige crystals soluble in chloroform, methanol and methylene chloride and insoluble in water, melting at 128° C.

*Analysis.*—Calcd. for $C_{13}H_{15}O_2ClS$ (molecular weight=270.78) (percent): C, 57.66; H, 5.58; Cl, 13.09; S, 11.84. Found (percent): C, 57.4; H, 5.5; Cl, 13.1; S, 11.8.

IR spectrum ($CHCl_3$):

Presence of non-conjugated acid at 1706 cm.$^{-1}$.
Presence of aromatic substituted with a heteroatom at 1606 and 1557 cm.$^{-1}$.
Presence of thioether.

As far as is shown, this compound is not described in the literature.

EXAMPLE V

Preparation of S-oxide of 4-(4'-tetrahydrothiapyranyl)-3-chloro-phenylacetic acid 2 gm. of 4-(4'-tetrahydrothiapyranyl)-3-chloro-phenylacetic acid dissolved in 20 cc. of acetic acid was added to 0.74 cc. of hydrogen peroxide at 110 volumes and the mixture was stirred for 4 hours at 15° C. and then was evaporated to dryness under reduced pressure. The residue was dissolved in 10 cc. of water and after filtration, the precipitate was washed with water and dried at 70° C. under reduced pressure to obtain 1.823 gm. of the raw S-oxide. The product was purified by recrystallization from hot and cold methanol to obtain 1.572 (75% yield) of the S-oxide of 4-(4'-tetrahydrothiapyranyl)-3-chloro-phenylacetic acid melting at 225° C. The product occurred as colorless crystals soluble in methanol and insoluble in water and chloroform.

*Analysis.*—Calcd. for $C_{13}H_{15}ClO_3S$ (molecular weight=286.78) (percent): C, 54.45; H, 5.27; Cl, 12.36; S, 1.19. Found (percent): C, 54.2; H, 5.5; Cl, 12.4; S, 10.8.

IR spectrum (Nujol):

Presence of carbonyl at 1709 cm.$^{-1}$ and absorption in the associated OH region.
Presence of aromatic.

Using a process analogous to Examples IV and V, the S→oxide of α-methyl - 4 - (4'-tetrahydrothiapyranyl)-3-chloro-phenylacetic acid was made.

As far as is known, these compounds are not described in the literature.

EXAMPLE VI

Preparation of S-dioxide of 4-(4'-tetrahydrothiapyranyl)-3-chloro-phenylacetic acid 2.25 cc. of hydrogen peroxide at 110 volumes was added to a solution of 2 gm. of 4-(4'-tetrahydrothiapyranyl)-3-chlorophenyl-acetic acid in 20 cc. of acetic acid heated to 60° C. and the mixture was stirred overnight at 60° C. 20 cc. of water were added thereto and the mixture was evaporated to dryness under reduced pressure. The residue was dissolved in 50 cc. of water and the solution was vacuum filtered. The precipitate was washed with water and dried at 70° C. under reduced pressure to obtain 1.979 gm. of raw S-dioxide. The raw product was purified by recrystallization from hot and cold methanol to obtain 1.374 gm. (67% yield) of the S-dioxide of 4-(4'-tetrahydrothiapyranyl)-4-chloro-phenylacetic acid melting at 162° C. The product occurred as colorless crystals soluble in methanol and insoluble in water and chloroform.

*Analysis.*—Calcd. for $C_{13}H_{15}ClO_4S$ (molecular weight=302.78) (percent): C, 51.57; H, 4.99; Cl, 11.71; S, 10.59. Found (percent): C, 51.3; H, 4.9; Cl, 11.7; S, 10.6.

IR spectrum (Nujol):

Absorption in the OH region.
Presence of carbonyl at 1739 cm.$^{-1}$.

As far as is known, this compound is not described in the literature.

EXAMPLE VII

Preparation of α-methyl-4-(4'-tetrahydropyranyl)-3-chloro-phenylacetic acid

Step A: 11.7 cc. of a solution of butyl lithium in hexane titrating 9.8 gm. per 100 cc. was added with stirring to a mixture of 48 cc. of tetrahydrofuran, 48 cc. of hexamethyl phosphortiamide and 1.85 cc. of anhydrous diethylamine cooled to −40° C. and then, while keeping the temperature at −40° C., a solution of 4.8 gm. of methyl 4-(4'-tetrahydropyranyl)-3-chloro-phenylacetate in 20 cc. of tetrahydrofuran was rapidly added thereto. Then, after returning the solution to −40° C., 3.6 cc. of methyl iodide were added thereto and the mixture was stirred at the said temperature for 10 minutes and then was allowed to warm up to 15° C. and stand there for 1 hour. The reaction mixture was poured into an ice-water mixture which was then extracted with ether. The ether phase was washed with water and methylene chloride is added to the ether phase and dried. The solvents were removed under reduced pressure to obtain raw methyl α-methyl-4-(4'-tetrahydropyranyl)-3-chloro-phenylacetate.

In analogous fashion, methyl 4-(4'-tetrahydropyranyl)-3-bromo-phenylacetate and methyl iodide were reacted to form methyl α-methyl-4-(4'-tetrahydropyranyl)-3-bromo-phenylacetate; methyl 4 - (4' - tetrahydrothiapyranyl)-3-chloro-phenylacetate and methyl iodide were reacted to form methyl α-methyl - 4 - (4'-tetrahydrothiapyranyl)-3-chloro-phenylacetate; and methyl 4-(4'-tetrahydropyranyl)-3-fluoro-phenylacetate and methyl iodide were reacted to form methyl α-methyl 4-(4'-tetrahydropyranyl)-3-fluoro-phenylacetate.

The starting esters were prepared in almost quantitative yields by reacting the free acid with diazomethane in methylene chloride.

As far as is known, these compounds are not described in the literature.

Step B: A mixture of the methyl α-methyl-4(4'-tetrahydropyranyl)-3-chloro-phenylacetate obtained in Step A, 50 cc. of ethanol and 5 cc. of 48° Bé potassium hydroxide solution was refluxed for 1 hour and after cooling to 20° C., the mixture was evaporated to dryness under reduced pressure. The residue was dissolved in 100 cc. of water and the solution was treated with carbon black and filtered. The pH of the filtrate was adjusted a pH of 1 by slow addition and stirring at 20° C. of 5 cc. of concentrated hydrochloric acid. The precipitated product was extracted with isopropyl ether, was washed with water until the wash waters were neutral, dried and the solvent was distilled off under reduced pressure to obtain α-methyl-4-(4' - tetrahydropyranyl)-3-chloro-phenylacetic acid similar to the product obtained previously.

The said acid was purified by recrystallization of from 10 cc. of isopropyl ether to obtain the product in the form of colorless crystals melting at 121° C.

In analogous fashion the corresponding esters of Step A were reacted to prepare α-methyl-4-(4'-tetrahydropyranyl)-3-bromo-phenylacetic acid, α-methyl-4-(4'-tetrahydrothiapyranyl) - 3 - chloro-phenylacetic acid, and α-methyl - 4 - (4' - tetrahydropyranyl) - 3 - fluoro - phenylacetic acid.

As far as is known, these compounds are not described in the literature.

EXAMPLE VIII

Preparation of α-ethyl-4-(4'-tetrahydropyranyl)-3-chlorophenylacetic acid

A solution of 14.5 cc. of butyl lithium in hexane titrating 9.8 gm. per 100 cc. was added to a mixture of 54 cc.

of tetrahydrofuran, 54 cc. of hexamethylphosphortriamide and 2.1 cc. of diethylamine cooled to −40° C. and then a solution of 5.4 gm. of methyl 4-(4'-tetrahydropyranyl)-3-chlorophenylacetate in 20 cc. of tetrahydrofuran and 3.6 cc. of ethyl iodide were added thereto. The mixture was stirred for 10 minutes and the temperature was returned to room temperature after which the mixture was poured into water. The mixture was extracted with ether and the organic phase was dried over sodium sulfate and evaporated to dryness under reduced pressure. The residue was dissolved in 59 cc. of ethanol and 5.9 cc. of potassium hydroxide solution were added thereto. The mixture was refluxed for 1 hour and after returning the temperature to room temperature, the mixture was evaporated to dryness under reduced pressure. The residue was dissolved in 100 cc. of water and the solution was treated with activated carbon and filtered. The pH of the filtrate was adjusted to 1 by the addition of 6 cc. of concentrated hydrochloric acid with agitation and a temperature below 25° C. The mixture was extracted with isopropyl ether and the organic phase was washed with water, dried over sodium sulfate and evaporated to dryness under reduced pressure to obtain 7.5 gm. of raw product. The raw product was purified by chromatography over silica gel with elution with a mixture of benzene-ethylacetate-acetic acid (49–49–2) and was recrystallized from isopropyl ether to obtain 2.15 gm. of α-ethyl-4-(4'-tetrahydropyranyl)-3-chloro-phenylacetic acid melting at 129° C. The product occurred as colorless crystals soluble in chloroform, methylene chloride and 2 N sodium hydroxide solution and insoluble in water.

Analysis.—Calculated for $C_{15}H_{19}ClO_3$ (molecular weight=282.76) (percent): C, 63.71; H, 6.77; Cl, 12.54. Found (percent): C, 64.0; H, 6.7; Cl, 12.7.

IR spectrum (CHCl):

Presence of cyclic C—O—C.
Presence of aromatic at 1608 cm.$^{-1}$.
Presence of carbonyl at 1718 and 1686 cm.$^{-1}$.

As far as is known, the free acid and its methyl ester are not described in the literature.

EXAMPLE IX

Step A: 4-(2,2-dimethyl-1,3-dioxolane) methyl ester of α-[3-chloro-4-(4' - tetrahydropyranyl) - phenyl]propionic acid.—A mixture of 3 gm. of α-methyl-4-(4'-tetrahydropyranyl)-3-chloro-phenylacetic acid and 15 cc. of thionyl chloride was heated for 1½ hours at 80° C., the excess of thionyl chloride is driven off, and after cooling to 5° C., 15 cc. of pyridine and 15 cc. of 2,2-dimethyl-4-hydroxymethyl-1,3-dioxolane were added thereto with stirring. The mixture was stirred at room temperature for 2 days and the reaction mixture was poured into water and extracted with ether. The organic phases were washed with saturated aqueous sodium bicarbonate solution, then with water until the wash waters were neutral, dried over magnesium sulfate and evaporated to dryness at reduced pressure to obtain 4.45 gm. of the [4-(2,2-dimethyl-1,3-dioxolane)]methyl ester of α - [3 - chloro-4-(4'-tetrahydropyranyl)-phenyl]propionic acid. The product occurred as a pale yellow amorphous solid soluble in chloroform, methanol and ether and insoluble in water.

Analysis.—Calculated for $C_{29}H_{27}ClO_5$ (molecular weight=382.88) (percent): C, 62.74; H, 7.10; Cl, 9.26. Found (percent): C, 62.7; H, 7.0; Cl, 9.2.

IR spectrum (CHCl$_3$):

Presence of ester, of cyclic

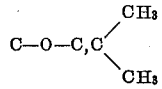

and aromatic.

As far as is known, this compound is not described in the literature.

Step B: A mixture of 5.38 gm. of the ester of Step A, 6.35 gm. of boric acid and 34 cc. of methoxy ethanol was heated at 95–100° C. for 2 hours and 40 minutes and after the temperature cooled to room temperature, the mixture was poured into water and extracted with ether. The organic phase was washed with a saturated aqueous sodium bicarbonate solution, then with water until the wash water was neutral, dried over magnesium sulfate and evaporated to dryness under reduced pressure. The residue was subjected to chromatography over magnesium silicate with ether elution. The ether eluate was evaporated to dryness under reduced pressure and dried to obtain 2.267 gm. of the propane-2,3-diol ester of α-[3-chloro-4-(4'-tetrahydropyranyl)-phenyl]propionic acid. The product occurred as a pale yellow amorphous product soluble in chloroform, ether and methanol and insoluble in water.

Analysis.—Calculated for $C_{17}H_{23}ClO_5$ (molecular weight=342.92) (percent): C, 59.56; H, 6.76; Cl, 10.34. Found (percent): C, 59.3; H, 6.9; Cl, 10.6.

IR spectrum (CHCl$_3$):

Presence of C=O at 1733 cm.$^{-1}$, free OH at 3580 cm.$^{-1}$ and associated OH.

As far as is known, this compound is not described in the literature.

EXAMPLE X

Step A: A mixture of 11.337 gm. of the methyl ester of α-[3-chloro-4-(4'-tetrahydropyranyl) - phenyl]propionic acid (prepared in Example VII), 200 cc. of 2,2-dimethyl-4-hydroxymethyl-1,3-dioxolane and 100 cc. of toluene was subjected to distillation to remove the toluene and the mixture was then cooled to room temperature. 1.904 gm. of sodium hydride as a 50% suspension in oil was added thereto and the reaction mixture was heated to 85° C. for 3 hours and then cooled to 15° C. The mixture was poured into water and was extracted with ether. The ether phase was washed with a saturated aqueous sodium bicarbonate solution, then with water until the wash waters were neutral, dried over magnesium sulfate and evaporated to dryness, under reduced pressure. The residue was subjected to chromatography over silica gel with elution with a mixture of ether-petroleum ether (50–50). The eluate was treated with activated carbon, filtered and evaporated to dryness under reduced pressure and dried at 85° C. at 0.6 mm. Hg pressure to obtain 9.685 gm. of the [4-(2,2-dimethyl-1,3-dioxolane)]methyl ester of α-[3-chloro-4-(4'-tetrahydropyranyl) - phenyl]propionic acid. The product was a yellow amorphous product soluble in chloroform, ether and methanol and insoluble in water.

Analysis.—Calculated for $C_{20}H_{27}ClSO_4$ (molecular weight=398.95) (percent): C, 60.21; H, 6.82; Cl, 8.89; S, 8.04. Found (percent): C, 60.5; H, 6.9; Cl, 8.6; S, 7.9.

IR spectrum (CHCl$_3$):

Presence of ester, of aromatic and

As far as is known, this compound is not described in the literature.

Step B: Propane-2,3-diol ester of α-[3-chloro-4-(4'-tetrahydropyranyl)-phenyl]propionic acid.—A mixture of 7 gm. of the ester of Step A, 10.8 gm. of boric acid and 50 cc. of methoxy ethanol was heated to 100° C. for 5 hours and after cooling to 20° C., 150 cc. of ether were added thereto. The ether phase was washed with water, a saturated aqueous sodium bicarbonate solution and with water until the wash waters were neutral, dried over sodium sulfate and evaporated to dryness. The residue was subjected to chromatography over silica gel with elution was a 50—50 mixture of chloroform and acetone. The eluate was evaporated to dryness under vacuum and the residue was dried at 80° C. and 0.6 mm. Hg to obtain 4.78 gm. of propane-2,3-diol ester of α-[3-chloro-4-(4'- tetrahydropyranyl)-phenyl]propionic acid. The product occurred as a clear yellow amorphous solid soluble in chloroform, ether, and methanol and insoluble in water.

*Analysis.* — Calcd. for $C_{17}H_{23}ClO_4S$ (molecular weight=358.88) (percent): C, 56.89; H, 6.46; Cl, 9.87; S, 8.33. Found (percent): C, 56.7; H, 6.3; Cl, 9.7; S, 8.6.

IR spectrum $(CHCl_3)$:

Presence of carbonyl at 1735 cm.$^{-1}$, of OH at 3581 cm.$^{-1}$ and associated OH and aromatic.

As far as is known, this compound is not described in the literature.

PHARMACOLOGICAL STUDY

(A) Anti-inflammatory activity

The test used was a slightly modified version of Branceni et al. [Arch. Int. Pharmacodyn. vol. 152 (1954), p. 15] and consisted of administering in a single injection 1 mg. of naphthoyl heparamine (NHA) under the plantar aponeurosis of the hind paw of rats weighing about 150 gm. to induce an inflammatory edema. The test compounds were orally administered in an aqueous suspension or solution one hour before the NHA administration. The inflammation was measured with an electric plethysmometer just before and 2 hours after the NHA injection. The increase in the paw volume between the 2 measurements is the degree of inflammation which is expressed in absolute values and percentage with respect to control animals. The activity of the product is determined as the degree of inflammation 40% with respect to the controls ($DA_{40}$) and the results are reported in the following tables. The tested compounds were 4-(4'-tetrahydropyranyl)-3-chloro-phenylacetic acid (A); racemic α-methyl-4-(4' - tetrahydropyranyl)-3-chloro-phenylacetic acid (B); 4-(4'-tetrahydrothiapyranyl)-3-chloro-phenylacetic acid (C); α-ethyl-4-(4'-tetrahydropyranyl)-3-chloro-phenylacetic acid (D); and the propane-2,3-diol ester of α-[4-(4'-tetrahydropyranyl)-3-chloro-phenyl]propionic acid (E).

TABLE I

| Lots | Dose in, mg./kg. | Increase of paw volume in 2 hours | Degree of inflammation in percent of that of controls |
|---|---|---|---|
| Controls | 0 | 15.75 | 100 |
| A | 50 | 5.125 | 33 |
| Controls | 0 | 20.8 | 100 |
| A | 5 | 10.0 | 48 |
|   | 25 | 4.8 | 23 |
| Controls | 0 | 18.9 | 100 |
| A | 2 | 12.3 | 65 |
|   | 6 | 8.0 | 42 |
| Controls | 0 | 18.50 | 100 |
| B | 1 | 8.63 | 46 |
|   | 5 | 7.00 | 38 |
| Controls | 0 | 18.00 | 100 |
| B | 0.500 | 8.75 | 49 |
| Controls | 0 | 13.25 | 100 |
| B | 0.250 | 6.25 | 47 |
| Controls | 0 | 25.0 | 100 |
| C | 0.500 | 20.4 | 82 |
|   | 1 | 15.8 | 57 |
|   | 10 | 8.8 | 35 |
| Controls | 0 | 26.8 | 100 |
| D | 0.5 | 18.9 | 71 |
|   | 1 | 15.4 | 57 |
| Controls | 0 | 19.6 | 100 |
| D | 2 | 8.5 | 43 |
| Controls | 0 | 22.1 | 100 |
| E | 1 | 12.8 | 58 |
| Controls | 0 | 20.6 | 100 |
| E | 0.500 | 16.9 | 82 |
|   | 2 | 12.1 | 59 |
| Controls | 0 | 26.3 | 100 |
| E | 0.750 | 13.6 | 52 |
|   | 1.5 | 11.1 | 42 |
|   | 3 | 8.5 | 32 |

The results in the above table clearly show that the test compounds have an excellent anti-inflammatory activity. The $DA_{40}$ for compound A was 6 mg./kg.; for compound B was 0.250 mg./kg.; for compound C was 1 mg./kg.; for compound D was <1 mg./kg. and for compound E was 0.9 mg./kg., while aspirin in the same test has a $D_{40}$ of 30 to 60 mg./kg. and indomethancin has a $DA_{40}$ of 2 mg./kg.

(B) Analgesic activity

The analagesic activity of the compounds was determined by the test of Koster et al. [Fred. Proc. vol. 18 (1959), p. 412] wherein an intraperitoneal injection of acetic acid to mice which causes repeated stretching and twisting for more than 6 hours and which is prevented or suppressed by an analgesic.

A 6% aqueous acetic acid solution containing 10% gum arabic was used at a dose of 0.01 cc./gm. or 60 mg./kg. to the mice of acetic acid. The test compounds were orally administered one half hour before the intraperitoneal administration of the acetic acid. The mice had not been fed for 12 hours. Groups of 5 mice were used for the controls and each dosage level. The number of stretchings were counted for each mouse for 15 minutes immediately following the acetic acid administration. The results are shown in Table II.

TABLE II

| Product | Dose in, mg./kg. | Number of stretchings in percent of those of controls |
|---|---|---|
| A | 10 | 72 |
|   | 20 | 44 |
|   | 50 | 28 |
| B | 20 | 68 |
|   | 50 | 36 |
|   | 100 | 38 |
|   | 200 | 26 |
| C | 1 | 77 |
|   | 2 | 58 |
|   | 5 | 32 |
| D | 2 | 66 |
|   | 5 | 75 |
|   | 10 | 63 |
|   | 20 | 37 |
|   | 50 | 26 |
| E | 5 | 87 |
|   | 10 | 53 |
|   | 20 | 22 |
|   | 50 | 12 |

Table II shows that the $DA_{50}$ in this test was 20 mg./kg. for compound A, 35 mg./kg. for compound B, 3 mg./kg. for compound C. 15 mg./kg. for compound D and 10 mg./kg. for compound E as compared to 160 mg./kg. for aspirin.

(C) Ulcergenic activity

The ulcergenic activity was determined by the test of Boissier et al. [Ther., vol. 22 (1967), p. 157]. Female rats weighing 120 to 140 gm. were starved for 24 hours and the test compounds were orally administered to the rats as an aqueous suspension in a volume of 0.4 cc. per 100 gm. of rat weight. The rats were killed 7 hours later or 31 hours after the last feeding and their stomachs were removed. The extent of ulcerious lesions was estimated for each stomach and their number and size was noted on a scale of 0 to 3. The results are shown in Table III.

TABLE III

| | Dose in, mg./kg. | Rating 0 to 3 |
|---|---|---|
| Controls | 0 | 0.1 |
| Compound A | 20 | 0.25 |
|   | 100 | 1.13 |
| Indomethacin | 15 | 1 |

Under the same conditions the compound D shows a middle ulcergenic degree at the dose of 110 mg./kg.

Various modifications of the compounds and methods of the invention may be made without departing from the spirit or scope thereof and it is to be understood that the invention is intended to be limited only as defined in the appended claims.

We claim:
1. A compound of the formula

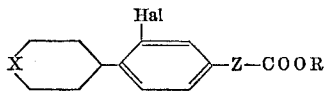

wherein X is selected from the group consisting of oxygen, sulfur, SO and SO₂, R is selected from the group consisting of hydrogen, anion of a non-toxic, therapeutically acceptable organic or mineral base and lower alkyl and 2,3-dihydroxypropyl and Z is selected from the group consisting of —CHR₁—, and >C=R₂ wherein R₁ is selected from the group consisting of hydrogen and straight or branched alkyl of 1 to 4 carbon atoms and R₂ is a straight or branched alkylidene of 1 to 4 carbon atoms and Hal is selected from the group consisting of fluorine, bromine and chlorine.

2. A compound of claim 1 wherein Z is CH—R₁ and R₁ is hydrogen and X is selected from the group consisting of oxygen and sulfur.

3. A compound selected from the group consisting of racemic mixtures and optically active isomers of compounds of claim 1 wherein X is selected from the group consisting of oxygen and sulfur and Z is —CHR₁ and R₁ is straight or branched alkyl of 1 to 4 carbon atoms.

4. A compound of claim 1 wherein X is selected from the group consisting of oxygen and sulfur and Z is >C=R₂ and R₂ is straight or branched alkylidene of 1 to 4 carbon atoms.

5. A compound of claim 1 wherein X is selected from the group consisting of SO and SO₂.

6. A compound of claim 1 selected from the group consisting of the 4 - (4' - tetrahydropyranyl) - 3 - chlorophenylacetic acid and its methyl ester.

7. A compound of claim 1 selected from the group consisting of the α-methyl-4-(4' - tetrahydropyranyl) - 3 - chlorophenylacetic acid and its methyl ester.

8. A compound of claim 1 selected from the group consisting of the 4-(4' - tetrahydropyranyl) - 3 - bromophenylacetic acid and its methyl ester.

9. A compound of claim 1 selected from the group consisting of the α-methyl 4-(4' - tetrahydropyranyl) - 3 - bromophenylacetic acid and its methyl ester.

10. A compound of claim 1 selected from the group consisting of the 4-( 4' -tetrahydropyranyl) - 3 - fluorophenylacetic acid and its methyl ester.

11. A compound of claim 1 selected from the group consisting of the α-ethyl 4-(4' - tetrahydropyranyl) - 3 - chloro-phenylacetic acid and its methyl ester.

12. A compound of claim 1 selected from the group consisting of the α-methyl 4-(4' - tetrahydropyranyl) - 3 - fluorophenylacetic acid and its methyl ester.

13. A compound of claim 1 which is the α-methylene 4-(4'-tetrahydropyranyl)-3-chloro-phenylacetic acid.

14. A compound of claim 1 which is the glycerol ester of α-[3-chloro-4-(4'-tetrahydropyranyl) - phenyl] - propionic acid.

15. A compound of claim 1 selected from the group consisting of the 4-(4'-tetrahydrothiapyranyl) - 3 - chlorophenylacetic acid and its methyl ester.

16. A compound of claim 1 selected from the group consisting of the α-methyl 4-(4'-tetrahydrothiapyranyl)-3-chloro-phenylacetic acid and its methyl ester.

17. A compound of claim 1 which is the S-oxide of the 4-(4'-tetrahydrothiapyranyl)-3-chloro-phenylacetic acid.

18. A compound of claim 1 which is the S-dioxide of the 4-(4'-tetrahydrothiapyranyl)-3 - chloro - phenylacetic acid.

19. A compound of claim 1 which is the S-oxide of the α-methyl-4-(4'-tetrahydrothiapyranyl)-3-chloro - phenylacetic acid.

20. A compound of claim 1 which is the glycerol ester of α-[3-chloro-4 - (4' - tetrahydrothiapyranyl) - phenyl]-propionic acid.

References Cited
UNITED STATES PATENTS
3,280,174  10/1966  Weil et al. _____ 260—476

HENRY R. JILES, Primary Examiner
C. M. S. JAISLE, Assistant Examiner

U.S. Cl. X.R.
260—345.1, 345.7, 345.8, 345.9; 424—275, 283